United States Patent [19]

Alldredge et al.

[11] 4,438,842
[45] Mar. 27, 1984

[54] SLIDE CONVEYOR WITH SIDE STABILIZERS

[76] Inventors: Robert L. Alldredge, 130 Pearl St., Apt. 1108, Denver, Colo. 80203; Robert J. Deltour, 16227 E. Arkansas Dr., Aurora, Colo. 80012

[21] Appl. No.: 401,916

[22] Filed: Jul. 26, 1982

Related U.S. Application Data

[63] Continuation of Ser. No. 74,345, Sep. 11, 1979, abandoned.

[51] Int. Cl.³ .............................................. B65G 15/60
[52] U.S. Cl. .................................... 198/838; 198/831; 198/845
[58] Field of Search ................................ 198/820–822, 198/838, 841, 845, 860, 861, 831, 837, 851, 852, 840; 104/134, 140

[56] References Cited

U.S. PATENT DOCUMENTS

| | | | |
|---|---|---|---|
| 1,089,306 | 3/1914 | Bell | 198/841 |
| 2,743,003 | 4/1956 | Allen | 198/851 |
| 3,093,235 | 6/1963 | Imse | 198/852 |
| 3,107,778 | 10/1963 | Jordan | 198/840 |
| 3,773,166 | 11/1973 | Nowacki | 198/841 |
| 3,788,455 | 1/1974 | Dieckmann | 198/841 |
| 3,934,708 | 1/1976 | Kambara | 198/838 |

FOREIGN PATENT DOCUMENTS

| | | |
|---|---|---|
| 1751186 | 3/1955 | Fed. Rep. of Germany . |
| 1736986 | of 1956 | Fed. Rep. of Germany . |
| 1914571 | 2/1965 | Fed. Rep. of Germany . |
| 1000281 | 1/1957 | Fed. Rep. of Germany ...... 198/822 |
| 1039924 | 9/1958 | Fed. Rep. of Germany ...... 198/845 |
| 1124424 | 2/1962 | Fed. Rep. of Germany . |
| 783200 | 9/1957 | United Kingdom ................ 198/838 |
| 807164 | 1/1959 | United Kingdom ................ 198/822 |

*Primary Examiner*—Robert J. Spar
*Assistant Examiner*—Jonathan D. Holmes
*Attorney, Agent, or Firm*—Kyle W. Rost

[57] ABSTRACT

A conveyor having a belt capable of following a curved path is mounted on a carriage having a central attachment to a conveyor chain and lateral attachments to a pair of side stabilizers. The conveyor operates on a track assembly having a central slide surface for contact with the chain and lateral stabilizer operating surfaces for contact with the stabilizers when they are in use. The stabilizers may be slightly elevated from their operating surfaces during normal conveyor operation with a balanced load on the belt, only touching the operating surfaces when the load becomes unbalanced. The track assembly is preferably in the cross-sectional shape of an I-beam with the conveyor operating on the flanges of the beam. Beam sections in regular geometric shapes such as vertical curves, horizontal curves, and straight sections are joined together in approximate alignment to form the desired conveyor path, and the slide surfaces are then shimmed into closer alignment if necessary. Each section may be prefabricated with appropriate mounting holes for the slide surface, lubricant injection holes, and drop out holes punched in a predetermined pattern in the beam flanges.

12 Claims, 7 Drawing Figures

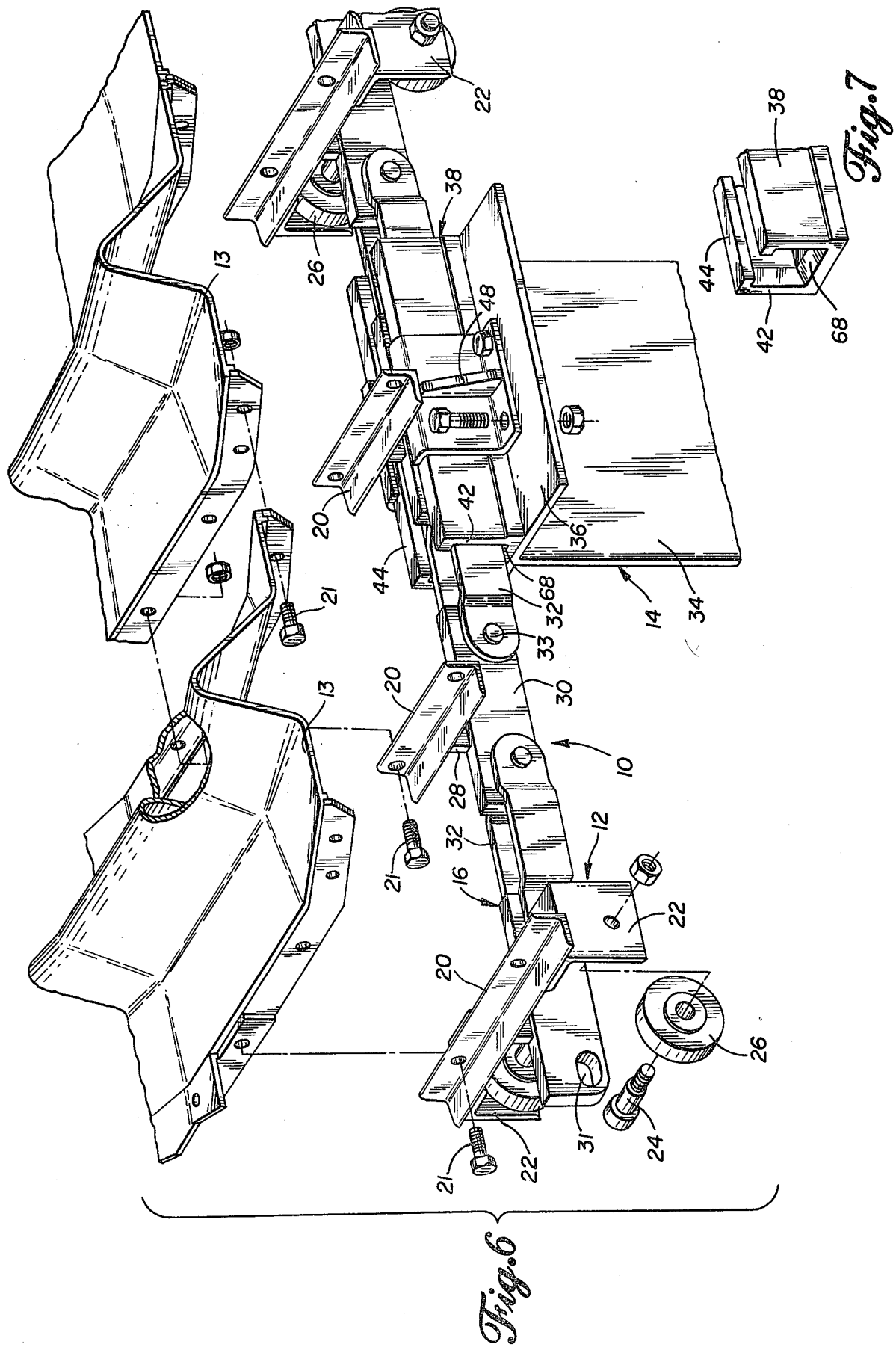

SLIDE CONVEYOR WITH SIDE STABILIZERS

This application is a continuation of application Ser. No. 74,345, filed Sept. 11, 1979, now abandoned.

BACKGROUND OF THE INVENTION

1. Field of the Invention

The invention relates to power driven conveyors and specifically to conveyors adapted to follow a curved path. The invention also relates to drag conveyors and to carriage and track assemblies therefor.

2. Description of the Prior Art

Conveyor belts adapted to move along a curved path are disclosed in basic U.S. Pat. No. 2,701,050 to Steinborn and in subsequent U.S. Pat. No. 2,836,283 to Horth and U.S. Pat. No. 3,169,631 to Knappe, among others, culminating in U.S. Pat. No. 4,144,965 to Alldredge et al. for a flexible track assembly for such conveyors. The teachings of these patents have been for a convoluted rubber belt with troughs between convolutions, and carriages for the belt having four running wheels or rollers that ride in a pair of channel shaped cross-section rails to support the conveyor belt both along straight runs and through curves in any relative direction. This type of conveyor has proven to be highly useful in many applications, including mining and quarry work.

To properly build the above referenced conveyor and track assembly requires a considerable amount of technical skill and precision to assure that track sections are properly aligned and smooth, and in addition the general requirement for high quality parts and materials in the construction, to withstand the forces encountered in typical applications, results in this type of conveyor being beyond the requirements of some potential users who would benefit from the conveyor's curve negotiating ability. To accomodate those applications where a lighter duty conveyor is adequate, it has been desired to produce a conveyor having good curve handling ability while requiring less technical skill and precision in manufacture, thus reducing costs and making the conveyor more readily available to a wider group of potential users.

The present invention realizes all of these goals in the creation of an easily assembled conveyor and track assembly able to negotiate curves.

SUMMARY OF THE INVENTION

An improved conveyor of the type having a belt adapted to follow a curved path and a conveyor chain adapted to curve both horizontally and vertically is constructed with a carriage carrying the belt and centrally connecting the belt to the chain as the primary support for the belt and its carried load. Flanking the central connection to the chain are a pair of spaced stabilizers, which may be rollers, but which are so oriented with respect to the central chain connection that the stabilizers do not bear substantial load forces during the normal, laterally balanced operation of the belt. The stabilizers preferably are slightly elevated from their underlying running surface during such balanced operation.

The track assembly for the conveyor is formed from a plurality of I-beam sections or other suitable support structures capable of being assembled in approximate abutment to create a rigid frame for support of the belt. The I-beam sections each have a slide surface formed from a synthetic plastic material for supporting the chain, and this slide surface may be in the form of a channel enclosing the chain on its bottom and sides, with flanges partially enclosing the top of the chain and defining an elongated slot to permit the connection between the chain and carriage to move with the chain while also retaining the chain against the flanges in the lower run of the conveyor when the carriage is inverted. The stabilizer operating surfaces may be portions of the I-beam flange not having a slide surface thereon.

The conveyor may be assembled in a novel manner that does not require precise alignment between I-beam segments. Since the slide surface is the primary support for the conveyor, only this portion of the track assembly must be aligned, permitting the I-beams to be joined by lap plates or like uniting means and then permitting the slide surfaces to be shimmed to the desired alignment. The I-beam sections may then be prefabricated, since exact fit and perfect alignment are unnecessary. Various regular geometric shapes of I-beams may be used, such as straight sections, horizontally curved sections, and vertically curved sections. Each section may have prepunched holes in the flanges thereof to receive appropriate fasteners for the slide surfaces, to create aligned drop out holes for removal of foreign objects from the slide surfaces, and to permit lubricant to be injected onto the slide surface during operation of the conveyor.

The primary object of the invention is to create a conveyor having the beneficial curving abilities of known prior art conveyors, while permitting more economical manufacture through simplified design.

Another object is to create a conveyor that spreads operating forces over a greater contact area between the conveyor and its base, as compared to equivalent prior art conveyors, to make practical the use of synthetic plastic materials in various contact areas between the conveyor and its normal running base.

BRIEF DESCRIPTION OF THE DRAWINGS

FIG. 6 is an exploded view of the conveyor.

FIG. 7 is a perspective view of an end fragment of the sliding surface, showing the beveled end thereof.

DESCRIPTION OF THE PREFERRED EMBODIMENT

Figure 1:
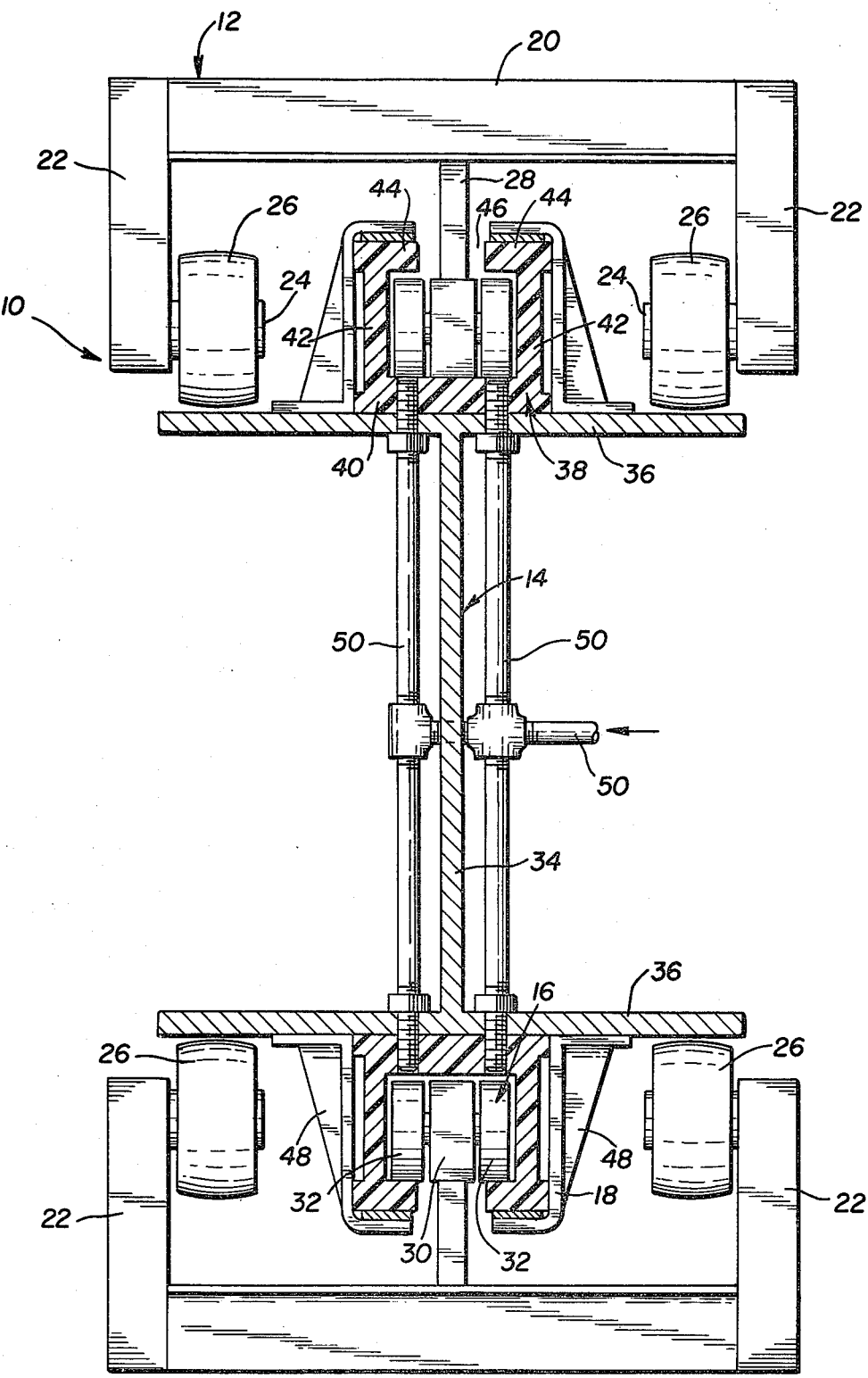
FIG. 1 is a vertical cross-section taken normally to the longitudinal axis of the conveyor, with the belt omitted.
Figure 2:
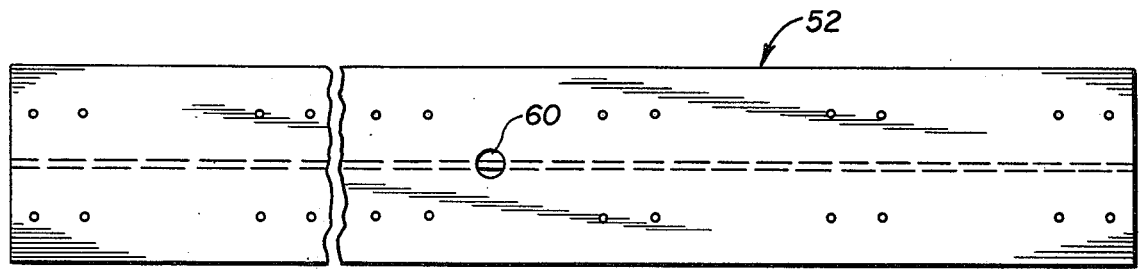
FIG. 2 is a top plan view of a straight track section.
Figure 3:
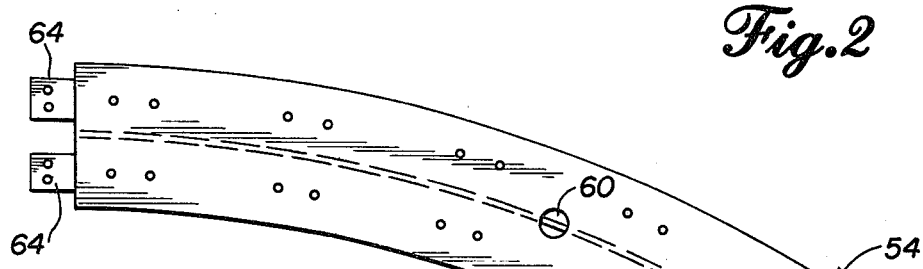
FIG. 3 is a top plan view of a horizontally curved track section.
Figure 4:
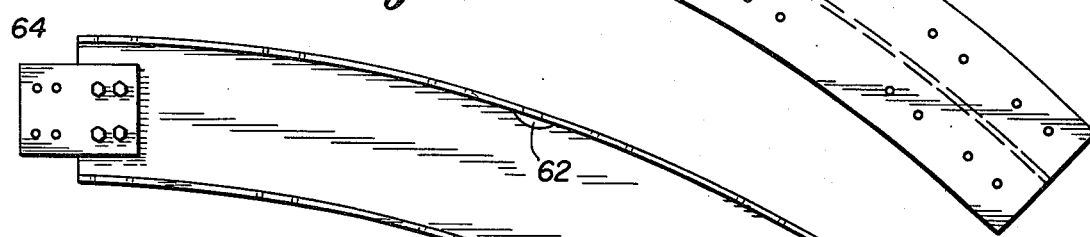
FIG. 4 is a side elevational view of a vertically curved track section.
Figure 5:
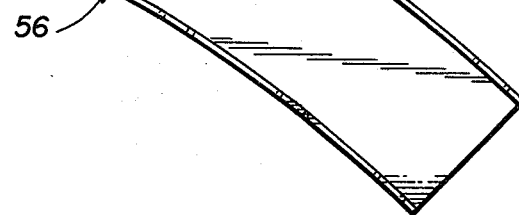
FIG. 5 is a top plan view of the vertically curved track section of FIG. 4.
Figure 5:
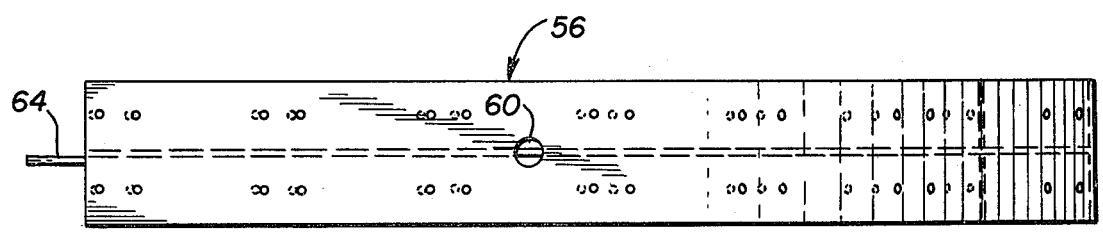

The conveyor 10 of FIGS. 1 and 6 is a drag-type conveyor having supplemental stabilizer wheels adapted for only intermittent use. Illustrated in the figures is a conveyor belt support carriage 12 adapted to carry a conveyor belt 13, FIG. 6, of a known type formed from resilient material such as rubber and having convolutions separating intermediate material-carrying pans. This type of belt is more fully disclosed in U.S. Pat. No. 2,701,050 to Steinborn, for which teaching that patent is incorporated by reference. The belt is formed in sections joined together by transverse flanges depending from the belt, and these flanges may be fastened by conventional nuts and bolts, which may also serve to join the belt to the transverse carriages 12. A longitudinal track assembly 14 having the general cross-sectional shape of an I-beam carries the carriage on the outer surfaces of the I-beam flanges. Specifically, the carriage is connected to the conveyor chain 16 that is longitudinally carried in plastic channel 18 mounted on the outer surface of the I-beam flange. The chain is dragged through the channel in the known manner by means of a powered sprocket engaging the chain at a point in the length of the conveyor run, usually at one end of the track assembly.

Carriage 12 includes a central attachment bar 20 adapted to be connected to the convoluted conveyor belt 13, for example by bolts 21 extending through holes in the bar 20 and mating holes in the conveyor belt flange. Bar 20 is transverse to the longitudinal axis of the belt and I-beam track assembly and carries at each lateral end a depending stabilizer wheel support arm 22, in turn carrying a stabilizer wheel axle 24 parallel to carriage 20 and transverse to the axis of chain 16. A wheel or roller 26 is mounted for rotation on axle 24.

The carriage 12 is connected to the conveyor chain 16 by means of a chain support arm 28 extending from the attachment bar 20. The chain is a block and pin link chain of the general type described in U.S. Pat. No. 3,093,235 to Imse, incorporated by reference for the teaching of this chain construction. Arm 28 extends from the approximate midpoint of bar 20 to the upper side of a block link 30 having a transverse hole 31 formed in each longitudinal end. Each pin link 32 is formed from a pair of longitudinal link plates joined together by a transversely extending pin 33 that also passes through the hole 31 at one end of each block link. The block links are thus intermediate a pair of pin links, and the holes in the block links are sized with respect to the pins in the pin links such that the pins have considerable wobble in the holes 31. As best shown in FIG. 6, holes 31 may be elongated longitudinally so that the chain can flex laterally for travel in an arc, in addition to the normal flexing for travel over a sprocket. The chain support arm may be attached to each block link near the longitudinal center of the link for uniform weight distribution against the track assembly.

The track assembly 14 consists primarily of an I-beam having the desired preformed contour to define a segment of the intended path of the conveyor. Each such I-beam has a central, generally upstanding web 34 joining together top and bottom flanges 36, respectively forming the top and bottom running surfaces of the conveyor track assembly. Each flange carries a plastic sliding surface or trough 38 over or through which the chain 16 is drawn. The preferred composition of the trough 38 is ultra high molecular weight (UHMW) polyethylene, although other low friction materials such as Teflon are also suitable. In the embodiment of FIG. 1, the UHMW trough encapsulates the chain on three sides with a bottom wall 40 and a pair of opposite walls 42. At the top of the side walls 42 are inwardly directed flanges 44 partially closing the top of the trough but defining a longitudinal opening slot 46 through which the chain support arm extends. The width of slot 46 is narrower than the transverse dimension of the chain so that the chain will be retained and ride on flanges 44 in the lower or return run of the conveyor, as shown in the lower portion of FIG. 1. Suitable gussets and buttresses 48 support the UHMW slide surfaces on the I-beam flange.

The operation of the conveyor 10 involves primarily the sliding of chain 16 over the UHMW slide surface, thereby drawing the entire conveyor along the path defined by the I-beam track assembly. As is well known in the conveyor art, the chain may engage a motor driven sprocket at one end of the track assembly to drive the chain and guide the chain from the top or operative run to the bottom or return run. At the opposite end of the I-beam track assembly an idler sprocket performs the guiding function. The UMHW slide surface provides a natural lubricity to reduce friction of conveyor movement, and, in addition, the design of the I-beam track assembly permits excellent access for the addition of lubricating materials into the trough. For example, lubricant injection conduits 50 may extend through the I-beam flanges and web and be connected to a supply of any suitable lubricating compound.

Because the majority of conveyor weight is carried on the chain 16, stabilizer wheels 26 bear weight only when the conveyor load has become unbalanced, tipping the carriage to either side. Under such conditions, one of the wheels 26 will momentarily ride on the flange 36 and thereby prevent substantial tipping of the load. However, in normal, balanced operation, the wheels 26 are supported by the carriage at a small distance above the flange so that no weight is carried by these wheels. The chain 16 permits lateral bending between its links by virtue of clearances in the fit of the pin links in the transverse holes in the block links, with the result that the block links in the chain are capable of tipping with respect to the pin links during periods of load imbalance. The normal clearance between the wheels 26 and I-beam flange is desired to be such that when the carriage tips to one side, the appropriate wheel 26 will strike the I-beam flange before the block link has tipped to a sufficient degree that it exhausts the clearance with the pin link. In this manner, the chain is prevented from becoming twisted in the trough or from applying an excessive weight to one side of the trough, and the contact area between the chain and trough surfaces is maintained at a relatively constant figure.

For purposes of comparison, the forces generated in the present conveyor may be compared to forces generated in the type of conveyor taught in U.S. Pat. No. 4,144,965, using substantially the same convoluted conveyor belt as the present invention but supporting the belt entirely on rollers operating in channel shaped rails. In such prior conveyors travelling through a horizontal curve of seventy two inch radius, with forty inch carriage spacing and four thousand pound chain tension, force is given by:

$$F = 4000\# \times (40/72) = 2222 \text{ lb total}.$$

If the rollers of the prior art conveyor are three inches in diameter and surface contact area is $\frac{1}{8}$ square inch, forces are approximately 20,000 lb./sq. in.

With the present conveyor under the same conditions, and having a four inch link in the chain, forces are as follows:

$$F = 4000\# \times (4/72) = 222\#.$$

Contact area is approximately one square inch, with the resultant unit force being 222 lb./sq. inch, or about one percent of the unit force produced by the equivalent roller supported conveyor under the same conditions. The lower unit forces permit the use of less expensive materials, such as UHMW polyethylene for the slide surface and for the stabilizer wheels. In addition, greater latitude is available in radius of curvature for the conveyor base and in vertical height change of the conveyor run.

A further aspect of the conveyor is illustrated in FIGS. 2-5, showing sections of the I-beam base that may be fabricated. Straight I-beam sections 52, FIG. 2, may be formed from, for example, six gage steel flats nine inches wide. Horizontal curving sections 54 and vertical curving sections 56, FIGS. 3-5, may have their flanges formed from flame cut 7 gage circle sections. Any of these flange sections may be punched with holes 58 in a standard repeating sequence to accomodate all of the gussets and buttresses used to support the slide surfaces. In addition, drop-out holes 60 may be prepunched in the flange surfaces in predetermined locations to mate with corresponding drop-out holes in the bottom wall 40 of the slide surface. The drop-out holes are of slightly larger diameter than the width of slot 46 so that substantially any foreign object capable of entering the slide trough can be discharged through the hole. The I-beam web 34 is undercut, as at 62 in FIG. 4, directly under the location of a drop-out hole to permit adequate room for removal of foreign objects. Other prepunched holes in the flange may accomodate lubricant pipes 50.

The prepunched hole pattern in the base flanges permit the UHMW polyethylene slide surfaces to be bolted to the flanges in good registry with the intended path of the conveyor. An entire conveyor of desired configuration may be assembled by combining the various shaped I-beam sections with lap plates 64, bolted between adjacent sections. The sections may be fabricated in standard predetermined lengths and curvatures, such as 2,4,6,8, and 10 foot lengths and curved sections of 6,12, and 18 foot radii and of 22 and 45 degrees of curvature either horizontally or vertically. At the joints between sections, it may be anticipated that the I-beams will not be in perfectly smooth alignment, but a further advantage of the conveyor is that machining for perfect alignment is not required. Rather, at each joint shims may be placed under or behind one or each of the slide surfaces on one end or the mating end to bring the slide surfaces into acceptable alignment. The ends of the slide surfaces may be beveled as at 68, FIG. 7, and therefore the alignment need not be precise. Prefabricated sections may be cut to desired length for production of non-standard conveyor lengths, and such cut off sections aligned with standard sections as previously described.

Various modifications of the new conveyor are possible, including track assembly contour, slide surface contour, and the method of attaching the slide surface to the underlying flange of the track assembly. The ability of the conveyor to negotiate lateral curves permits the lower or return run to be eliminated in favor of a laterally closed conveyor loop. In this instance, the track assembly may have the cross-sectional contour of a T-beam rather than an I-beam, as suggested in the cut-away view of the track assembly in FIG. 6. When it is thus unnecessary to support the conveyor carriages in an inverted position, the slide surface may have a more open top, eliminating the top flanges 44. It is also possible to eliminate the use of buttresses and gussets to clamp the UHMW polyethylene slide surface to the beam flange 36 in many or all embodiments of the conveyor, instead bolting or otherwise fastening the slide surface directly to the flange 36. The means for interconnecting beam sections may be other than lap plates, or may be a combination of lap plates on different parts of the beam sections, such as lap plates connecting adjacent webs on some beams and connecting adjacent flanges on other lap plates. Floor, wall, or ceiling mounted legs may provide support to the track assembly and simultaneously provide joining means between beam sections.

The above description has been provided by way of example and not limitation, which is imposed only by the following claims.

We claim:

1. An improved conveyor of the type having a convoluted longitudinally extending belt adapted to follow a laterally and vertically curved path and a conveyor chain capable of both lateral and vertical bending with the path of the belt, wherein the improvement comprises:
   (a) a longitudinally extending conveyor track assembly carrying a longitudinally oriented chain slide surface defining substantially the full length of the operational conveyor path and having a bottom and opposite side walls thereon, and carrying on each lateral side of the slide surface a stabilizer operating surface;
   (b) a belt carriage connected to the conveyor belt and extending transversely thereto, having a central connecting means for joining the carriage to a single conveyor chain substantially at the transverse center of the belt and having a pair of laterally speced stabilizer means flanking said central connecting means and overlying the stabilizer operating surfaces when the chain overlies said slide surface bottom wall, the stabilizer means being oriented with respect to the central connecting means and chain such that at substantially any point along the length of the chain slide surface when the carriage is laterally evenly weighted the chain is in force bearing contact with said slide surface and the stabilizer means are without force bearing contact with said stabilizer operating surfaces; and
   (c) wherein the chain is of the type formed from pin links and intermediate block links, the central connecting means being joined only to the block links, the block links being of the type having a transverse hole at each end thereof for receiving the pin of a pin link and the hole being sufficiently larger in diameter than the pin that the block link is capable of a predetermined degree of lateral tilting before the block link applies twisting torque to the pin, and wherein the stabilizer means are oriented with respect to the central connecting means such that a stabilizer means will contact an operating surface in force bearing relationship when the carriage is laterally unevenly wieghted prior to the time that a block link applies substantial twisting torque to a pin.

2. The conveyor of claim 1, wherein said conveyor track assembly comprises a longitudinally extending, vertically oriented web and a flange connected to the top edge of the web normally thereto, said flange carrying the slide surface on the top surface thereof.

3. The conveyor of claim 2, wherein said conveyor track assembly further comprises a second flange connected normally to said web at the bottom edge thereof.

4. The conveyor of claim 3, wherein each of said flanges is connected to the web along the longitudinal central axis of the flange.

5. The conveyor of claim 1, wherein each of said stabilizer means comprises a roller carried by the carriage at a spaced distance from the stabilizer operating surface when the carriage is laterally evenly weighted.

6. The conveyor of claim 1, wherein said conveyor track assembly comprises a plurality of discrete track segments joined by local uniting means, each discrete segment having a regular geometric shape selected from the group consisting of straight segments, horizontally curved segments, and vertically curved segments.

7. The conveyor of claim 6, wherein said segments are joined in substantial abutment and said uniting means comprise lap plates.

8. The conveyor of claim 6, wherein a track segment comprises an I-beam base having a central web joined to a top and bottom flange, said flanges carrying the slide surface axially thereon, the flanges and slide surfaces defining aligned drop out holes therethrough, and the beam web defining an opening undercutting the dropout hole of the flange.

9. The conveyor of claim 6, wherein said chain slide surface further comprises a bevel at the longitudinal ends of said track segments to define a smoothly continuous chain path between adjacent track segments with only approximate alignment of the track segments.

10. The conveyor of claim 1, wherein said track assembly comprises a T-beam in transverse cross-section.

11. An improved conveyor of the type having a continuous longitudinally extending belt adapted to follow a laterally and vertically curved operational path and having a conveyor chain capable of both lateral and vertical bending with the path of the belt, wherein the improvement comprises:

(a) a longitudinally extending conveyor track assembly defining a curved operational path and carrying for substantially the entire length of said operational path a longitudinally oriented chain slide surface having a bottom wall, a pair of opposite side walls, and a pair of inwardly directed top flanges forming a longitudinally extending slot of predetermined width between them, said slide channel defining a central, longitudinally extending volume for receipt of the conveyor chain;

(b) the conveyor chain being carried in the slide channel and being of the type formed from pin links and intermediate block links, the block links having a transverse hole formed at each end thereof for receiving a pin of a pin link, the hole being sufficiently larger in diameter than the pin that the block link is capable of a predetermined degree of lateral tilting before the block link applies twisting torque to the pin for permitting the chain to follow the curved operational path;

(c) a belt carriage connected to the conveyor belt and including a central connecting means joining the carriage to the block links of the conveyor chain substantially at the transverse center of the belt and transmitting substantially the entire weight of the conveyor belt along the operational path to the block links in substantially balanced lateral distribution; and (d) wherein the width of the chain is greater than said predetermined width of the channel slot for positive retention of the chain the channel regardless of weight distribution of the belt, and, in use, a carried load.

12. The conveyor of claim 11, further comprising a means for limiting the degree of lateral tilting of the conveyor chain within said slide channel.

* * * * *

REEXAMINATION CERTIFICATE (1325th)
United States Patent [19]
Alldredge et al.

[11] B1 4,438,842
[45] Certificate Issued    Jul. 17, 1990

[54] SLIDE CONVEYOR WITH SIDE STABILIZERS

[76] Inventors: Robert L. Alldredge, 130 Pearl St., Apt. 1108, Denver, Colo. 80203; Robert J. Deltour, 16227 E. Arkansas Dr., Aurora, Colo. 80012

Reexamination Request:
No. 90/001,847, Sep. 25, 1989

Reexamination Certificate for:
| | |
|---|---|
| Patent No.: | 4,438,842 |
| Issued: | Mar. 27, 1984 |
| Appl. No.: | 401,916 |
| Filed: | Jul. 26, 1982 |

Related U.S. Application Data

[63] Continuation of Ser. No. 74,345, Sep. 11, 1979, abandoned.

[51] Int. Cl.[5] ............................................. B65G 15/60
[52] U.S. Cl. ................................... 198/838; 198/831; 198/845
[58] Field of Search ............................. 198/820–822, 198/838, 841, 845, 860, 861, 831, 837, 851, 852, 840; 104/134, 140

[56] References Cited

U.S. PATENT DOCUMENTS

| | | | |
|---|---|---|---|
| 1,089,306 | 3/1914 | Bell | 198/841 |
| 1,939,862 | 12/1933 | Preble . | |
| 2,071,485 | 2/1937 | Worrall . | |
| 2,297,813 | 10/1942 | Stork . | |
| 2,743,003 | 4/1956 | Allen | 198/851 |
| 3,093,235 | 6/1963 | Imse | 198/852 |
| 3,107,778 | 10/1963 | Jordan | 198/840 |
| 3,773,166 | 11/1973 | Nowacki | 198/841 |
| 3,788,455 | 1/1974 | Dieckmann | 198/841 |
| 3,934,708 | 1/1976 | Kambara | 198/838 |

FOREIGN PATENT DOCUMENTS

| | | | |
|---|---|---|---|
| 1751186 | 3/1955 | Fed. Rep. of Germany . | |
| 1736986 | 12/1956 | Fed. Rep. of Germany . | |
| 1000281 | 1/1957 | Fed. Rep. of Germany | 198/822 |
| 1039924 | 9/1958 | Fed. Rep. of Germany | 198/845 |
| 1124424 | 2/1962 | Fed. Rep. of Germany . | |
| 1914571 | 2/1965 | Fed. Rep. of Germany . | |
| 783200 | 9/1957 | United Kingdom | 198/838 |
| 807164 | 1/1959 | United Kingdom | 198/822 |

OTHER PUBLICATIONS

Serpentix Model H Conveyor, 1550 South Pearl Street, Denver, Colorado 80210.
Rexnord R76 catalog-©1976.

*Primary Examiner*—Joseph J. Rolla

[57] ABSTRACT

A conveyor having a belt capable of following a curved path is mounted on a carriage having a central attachment to a conveyor chain and lateral attachments to a pair of side stabilizers. The conveyor operates on a track assembly having a central slide surface for contact with the chain and lateral stabilizer operating surfaces for contact with the stabilizers when they are in use. The stabilizers may be slightly elevated from their operating surfaces during normal conveyor operation with a balanced load on the belt, only touching the operating surfaces when the load becomes unbalanced. The track assembly is preferably in the cross-sectional shape of an I-beam with the conveyor operating on the flanges of the beam. Beam sections in regular geometric shapes such as vertical curves, horizontal curves, and straight sections are joined together in approximate alignment to form the desired conveyor path, and the slide surfaces are then shimmed into closer alignment if necessary. Each section may be prefabricated with appropriate mounting holes for the slide surface, lubricant injection holes, and drop out holes punched in a predetermined pattern in the beam flanges.

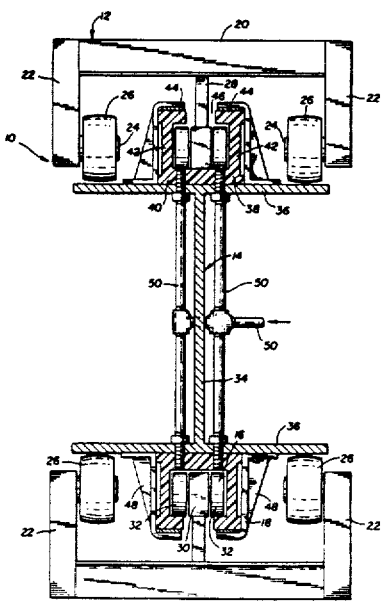

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 11 are determined to be patentable as amended.

Claims 2-10 and 12, dependent on an amended claim, are determined to be patentable.

1. An improved conveyor of the type having a convoluted longitudinally extending belt adapted to follow a laterally and vertically curved path and a conveyor chain capable of both lateral and vertical bending with the path of the belt, wherein the improvement comprises:
   (a) a longitudinally extending conveyor track assembly carrying a longitudinally oriented chain slide surface defining substantially the full length of the operational conveyor path and having a bottom and opposite side walls thereon, and carrying on each lateral side of the slide surface a stabilizer operating surface;
   (b) a belt carriage connected to the conveyor belt and extending transversely thereto, having a central connecting means for joining the carriage to a single conveyor chain substantially at the transverse center of the belt and having a pair of laterally [speced] *spaced* stabilizer means flanking said central connecting means and overlying the stabilizer operating surfaces when the chain overlies said slide surface bottom wall, the stabilizer means being oriented with respect to the central connecting means and chain such that at substantially any point along the length of the chain slide surface when the carriage is laterally evenly weighted the chain is in force bearing contact with said slide surface and the stabilizer means are without force bearing contact with said stabilizer operating surfaces; and
   (c) wherein the chain is of the type formed from pin links and intermediate block links, the central connecting means being joined only to the block links, the block links being of the type having a transverse hole at each end thereof for receiving the pin of a pin link and the hole being sufficiently larger in diameter than the pin that the block link is capable of a predetermined degree of lateral tilting before the block link applies twisting torque to the pin, and wherein the stabilizer means are oriented with respect to the central connecting means such that a stabilizer means will contact an operating surface in force bearing relationship when the carriage is laterally unevenly [wieghted] *weighted* prior to the time that a block link applies substantial twisting torque to a pin.

11. An improved conveyor of the type having a continuous longitudinally extending belt adapted to follow a laterally and vertically curved operational path and having a conveyor chain capable of both lateral and vertical bending with the path of the belt, wherein the improvement comprises:
   (a) a longitudinally extending conveyor track assembly defining a curved operational path and carrying for substantially the entire length of said operational path a longitudinally oriented chain slide [surface] *channel* having a bottom wall, a pair of opposite side walls, and a pair of inwardly directed top flanges forming a longitudinally extending slot of predetermined width between them, said slide channel defining a central, longitudinally extending volume for receipt of the conveyor chain;
   (b) the conveyor chain being carried in the slide channel and being of the type formed from pin links and intermediate block links, the block links having a transverse hole formed at each end thereof for receiving a pin of a pin link, the hole being sufficiently larger in diameter than the pin that the block link is capable of a predetermined degree of lateral tilting before the block link applies twisting torque to the pin for permitting the chain to follow the curved operational path;
   (c) a belt carriage connected to the conveyor belt and including a central connecting means joining the carriage to the block links of the conveyor chain substantially at the transverse center of the belt and transmitting substantially the entire weight of the conveyor belt along the operational path to the block links in substantially balanced lateral distribution; and
   (d) wherein the width of the chain is greater than said predetermined width of the channel slot for positive retention of the chain *in* the channel regardless of weight distribution of the belt, and, in use, a carried load.

* * * * *